(12) United States Patent
Fayan et al.

(10) Patent No.: US 7,194,676 B2
(45) Date of Patent: Mar. 20, 2007

(54) PERFORMANCE RETIMING EFFECTS ON SYNCHRONIZED DATA IN AN EDITING SYSTEM

(75) Inventors: Randy M. Fayan, Medford, MA (US); Katherine H. Cornog, Newburyport, MA (US)

(73) Assignee: Avid Technology, Inc., Tewksbury, MA (US)

( * ) Notice: Subject to any disclaimer, the term of this patent is extended or adjusted under 35 U.S.C. 154(b) by 484 days.

(21) Appl. No.: 10/086,478

(22) Filed: Mar. 1, 2002

(65) Prior Publication Data
US 2003/0164845 A1 Sep. 4, 2003

(51) Int. Cl.
*G06N 3/00* (2006.01)

(52) U.S. Cl. .................................. 715/501.1; 715/723

(58) Field of Classification Search ............. 715/500.1, 715/501.1, 513, 517, 723, 724, 725, 726, 715/523, 524, 525, 526, 530, 500; 348/194
See application file for complete search history.

(56) References Cited

U.S. PATENT DOCUMENTS

| | | | |
|---|---|---|---|
| 4,924,310 A | 5/1990 | von Brandt | 375/240.16 |
| 5,182,633 A | 1/1993 | Antonio et al. | 348/441 |
| 5,353,119 A | 10/1994 | Dorricott et al. | 348/446 |
| 5,369,443 A | 11/1994 | Woodham | 348/578 |
| 5,410,358 A | 4/1995 | Shackleton et al. | 348/459 |
| 5,438,432 A | 8/1995 | Koue | 358/426.6 |
| 5,469,226 A | 11/1995 | David et al. | 348/699 |
| 5,568,200 A | 10/1996 | Pearlstein et al. | 357/240.27 |
| 5,579,054 A | 11/1996 | Sezan et al. | 348/452 |
| 5,594,676 A | 1/1997 | Greggain et al. | 708/300 |
| 5,608,464 A | 3/1997 | Woodham | 348/578 |
| 5,615,401 A * | 3/1997 | Harscoet et al. | 719/322 |
| 5,642,170 A | 6/1997 | Hackett et al. | 348/459 |
| 5,642,171 A * | 6/1997 | Baumgartner et al. | 348/515 |
| 5,654,771 A | 8/1997 | Tekalp et al. | 348/699 |
| 5,657,402 A | 8/1997 | Bender et al. | 382/284 |
| 5,668,914 A | 9/1997 | Inuiya et al. | 386/46 |
| 5,673,207 A | 9/1997 | Nomura | 348/701 |

(Continued)

OTHER PUBLICATIONS

Shapiro, et al., "Computer Vision," 2001. Prentice Hall, pp. 321-324.*

(Continued)

*Primary Examiner*—Stephen Hong
*Assistant Examiner*—Kyle R. Stork
(74) *Attorney, Agent, or Firm*—Peter J. Gordon; John A. Hamilton

(57) ABSTRACT

A retiming function that defines a rampable retiming effect is used to generate new audio and video samples at appropriate output times. In particular, for each output time, a corresponding input time is determined from the output time by using the retiming function. The retiming function may be a speed curve, a position curve that maps output times to input times directly or a mapping defining correspondence times between points in the video data and points in the audio data. An output sample is computed for the output time based on at least the data in the neighborhood of the corresponding input time, using a resampling function for the type of media data. Synchronization is achieved by ensuring that the input times determined to correspond to output times for video samples correspond to the input times determined to correspond to the same output times for audio samples.

34 Claims, 6 Drawing Sheets

U.S. PATENT DOCUMENTS

| | | | |
|---|---|---|---|
| 5,693,902 A | 12/1997 | Hufford et al. | 84/650 |
| 5,727,080 A | 3/1998 | Cox et al. | 382/168 |
| 5,748,761 A | 5/1998 | Chang et al. | 382/107 |
| 5,748,842 A * | 5/1998 | Holmes et al. | 704/270 |
| 5,802,220 A | 9/1998 | Black et al. | 382/276 |
| 5,850,229 A | 12/1998 | Edelsbrunner et al. | 345/473 |
| 5,877,445 A | 3/1999 | Hufford et al. | 84/602 |
| 5,880,788 A | 3/1999 | Bregler | 348/515 |
| 5,920,657 A | 7/1999 | Bender et al. | 282/284 |
| 5,929,919 A | 7/1999 | DeHaan et al. | 348/452 |
| 5,940,145 A | 8/1999 | Burl | 348/699 |
| 5,943,445 A | 8/1999 | Dufaux | 382/236 |
| 5,973,733 A | 10/1999 | Gove | 348/208.13 |
| 5,982,389 A | 11/1999 | Guenter et al. | 345/474 |
| 5,982,440 A | 11/1999 | Aoki | 375/290.16 |
| 5,991,459 A | 11/1999 | Fogel | 382/264 |
| 5,999,662 A | 12/1999 | Burt et al. | 382/284 |
| 6,005,626 A | 12/1999 | Ding | 375/240 |
| 6,016,152 A | 1/2000 | Dickie | 345/648 |
| 6,026,195 A | 2/2000 | Eifrig et al. | 382/236 |
| 6,037,988 A | 3/2000 | Gu et al. | 375/240.16 |
| 6,075,818 A | 6/2000 | Thomson | 375/240 |
| 6,081,606 A | 6/2000 | Hansen et al. | 382/107 |
| 6,088,393 A | 7/2000 | Knee et al. | 375/240 |
| 6,157,747 A | 12/2000 | Szeliski et al. | 382/284 |
| 6,160,586 A | 12/2000 | Justiss et al. | 398/452 |
| 6,181,383 B1 | 1/2001 | Fox et al. | 348/515 |
| 6,188,396 B1 * | 2/2001 | Boezeman et al. | 715/500.1 |
| 6,246,961 B1 | 6/2001 | Sasaki et al. | 701/301 |
| 6,250,928 B1 | 6/2001 | Poggio et al. | 434/185 |
| 6,262,776 B1 | 7/2001 | Griffits | 348/512 |
| 6,292,589 B1 | 9/2001 | Chow et al. | 382/239 |
| RE37,418 E * | 10/2001 | Tindell et al. | 715/500.1 |
| 6,370,196 B1 | 4/2002 | Griessl et al. | 375/240.16 |
| 6,404,978 B1 * | 6/2002 | Abe | 386/55 |
| 6,477,279 B2 | 11/2002 | Go | 382/240 |
| 6,480,670 B1 | 11/2002 | Hatano et al. | 386/109 |
| 6,526,183 B1 | 2/2003 | Bonnet et al. | 382/284 |
| 6,570,624 B2 | 5/2003 | Cornog et al. | 348/446 |
| 6,628,715 B1 | 9/2003 | Iu et al. | 375/240.16 |
| 6,665,450 B1 * | 12/2003 | Cornog et al. | 382/276 |
| 6,728,312 B1 | 4/2004 | Whitford et al. | 375/240.01 |
| 7,043,058 B2 | 5/2006 | Cornog et al. | 382/107 |
| 7,103,231 B2 | 9/2006 | Cornog et al. | 382/276 |
| 2002/0143547 A1* | 10/2002 | Fay et al. | 704/270 |
| 2002/0154792 A1 | 10/2002 | Cornog et al. | 382/107 |

OTHER PUBLICATIONS

Levine et al., "A Sines+Transients+Noise Audio Representation for Data Compression and Time/Pitch Scale Modifications," <http://www-ccrma.stanford.edu/~scott1/papers.html>, 1998, pp. 1-21.*

Haggard, "Class Delivery via Streaming Audio/Video over the Internet," <http://www.ece.tntech.edu/Rlh/Papers/Streaming_AV.htm>, 2002, pp. 1-7.*

Herrtwich, "Summary of the Second Internation Workshop on Network and Operating Systems Support for Digital Audio and Video," 1992, pp. 32-59.*

Argawal, Maneesh, et al., Model-Based Motion Estimation for Synthetic Animations, ACM Multimedia 95 Electronic Proceedings, Nov. 5-9, 1995, pp. 1-25.

Barron, J.L., "Performance of Optical Flow Techniques", IJCV 12:1, 1994, pp. 1-60.

Beauchemin, S.S., et al., "The Computation of Optical Flow", ACM Computing Surveys, vol. 27, No. 3, Sep. 1995, pp. 433-467.

Bergen, J.R., et al., "Hierarchical Model-Based Motion Estimation", Proc.Euro.Conf. on Computer Vision, Springer-Verlag, 1992, pp. 237-252.

Bergen, et al., "Hierarchial Motion-Based Frame Rate conversion", David Sarnoff Research center, Princeton, NJ, Apr. 1990, pp. 1-15.

Bouthemy, Patrick, "A Maximum Likelihood Framework for Determining Moving Edges", IEEE Transactions On Pattern Analysis And Machine Intelligence, vol. II, No. 5, May 1989, pp. 499-511.

Buxton, B.F., et al., "Computation of optic flow from the motion of edge features in image Sequences", Image and Viewing Computing, vol. 2, No. 2, May 1984, pp. 59-75.

Chen, Shenchang Eric, et al., "View Interpolation for Image Synthesis", Proc. SIGGRAPH 1993, pp. 279-288.

Ezzat, Tony, et al., "Visual Speech Synthesis by Morphing Visemes", Massachusetts Institute of Technology, A.I. Memo No. 1658, CBCL Paper No. 173, May 1999, pp. 1-12.

Flomo Data Sheet, Time-warping software, Aug. 2002, 2 pages.

Goldenstein, Siome and Gomes, Jonas, "Time Warping of Audio Signals", in Proc. Comp. Graph. Internatinal (CGI 99), Jul. 1999, pp. 52-57.

Liu, Hongche, et al., "Accuracy vs. Efficiency Trade-offs in Optical Flow Algorithms", Proc. 4th Euro.Conf. on Comp.Vision, Apr. 1996, vol. II, pp. 174-183.

Louchet, Jean et al., "Building new tools for Synthetic Image Animation by using Evolutionary Techniques", Artificial Evolution '95 Proc. of the EA95 Workshop in Brest, France, Sep. 1995, 14 pgs.

Lucas, Bruce et al., "An Interactive Image Registration Technique with and Application to Stereo Vision", Proc. 7th Int'l Joint Conf. on AI, 1981, pp. 674-679.

Marshall, David, "Optical Flow Printout", http://www.cs.cf.ac.uk/Dave/Vision_lecture/node45.html.

Schodl, Arno, et al., "Video Textures", Proc. SIGGRAPH 2000, 2000, pp. 489-498.

Smith, Julius O., III, "Banlimited Interpolation - Introduction and Algorithm", Center for Computer Research in Music and Acoustics, Stanford University, Stanford, CA, Jan. 5, 1993, pp. 1-11.

Teodosio, Laura, et al., "Salient Video Stills: Content and Context Preserved", Proc. 1st Conf. On Multimedia, Aug. 1993, pp. 39-46.

* cited by examiner

PERFORMANCE RETIMING EFFECTS ON SYNCHRONIZED DATA IN AN EDITING SYSTEM

BACKGROUND

During editing of an audiovisual work, it is common to expand or to contract an audiovisual clip to fit a particular time slot or to create a perceptual rate change. Such operations may be performed for a creative purpose or for a technical purpose. There are a number of terms used to describe such operations, including "motion effect," "fit-to-fill," "time scaling," or, generally, a "retiming effect." If the operation has the effect of changing the perceived playback rate from one constant rate to another constant rate, then the operation may be called a "constant" retiming effect. If the operation has the effect of providing a perceived playback rate that varies over the length of the clip, then the operation may be called a "rampable" retiming effect. The variable rate change of a rampable retiming effect commonly is defined by a function curve. The function curve typically is a speed curve that describes how the perceived playback speed varies from the original playback speed, in terms of a percentage of the original playback speed.

There are many ways in which such retiming effects may be implemented. Commonly, a retiming effect is performed by stretching one of the audio or video tracks to match timing of the other track. Video and audio also typically are retimed separately. Video is retimed in video post-production using techniques such as sample and hold, blended frames or motion-based interpolation. In audio post-production, the audio may be replaced with another soundtrack, may remain unchanged or may be retimed using techniques such as time scaling or pitch shifting. Both audio retiming techniques change the perceived playback rate of the audio, but time scaling may be used to avoid or control modifying the pitch.

Because the video and audio typically are retimed separately, the video and audio typically are retimed using different speed curves or using the same function curve but sampled by different sampling rates. Either technique makes it difficult to retain synchronization between the audio and video.

SUMMARY

During editing of an audiovisual work, it would be desirable to see and hear the result of a rampable retiming effect on a clip of synchronized audio and video data that produces a retimed result of synchronized audio and video data. An editing system that processes such rampable retiming effects retimes and synchronizes playback of both the audio and video data in the clip.

To allow synchronized playback, a retiming function that defines the rampable retiming effect is used to generate new audio and video samples at appropriate output times. In particular, for each output time, a corresponding input time is determined from the output time by using the retiming function. The retiming function may be a speed curve, a position curve that maps output times to input times directly or a mapping defining correspondence times between points in the video data and points in the audio data. An output sample is computed for the output time based on at least the data in the neighborhood of the corresponding input time, using a resampling function for the type of media data. The neighborhood of the corresponding input time is a plurality of samples from points in time surrounding the input time. The number of input samples actually used depends on the resampling function used. A resampling function generates an output sample from a plurality of input samples at different points in time by combining information from the plurality of input samples. An example resampling function is interpolation. Synchronization is achieved by ensuring that the input times determined to correspond to output times for video samples correspond to the input times determined to correspond to the same output times for audio samples. In other words, synchronization is achieved by using the same mapping of input and output times based on the retiming function to drive the resampling functions.

There are several ways to perform such retiming in several different workflows for creating an audiovisual work that includes a rampable retiming effect. The typical workflows include using a video editing system to edit the audiovisual work, with a focus on the video, followed by using an audio editing system to edit, primarily, the corresponding audio. For some audiovisual works, such as music videos, the audio is edited first and the video is retimed to match the audio. In some workflows, audio is edited on the video editing system. In each of these applications, the retiming function may be a speed curve, position curve or a mapping defining correspondence times between points in the video data and points in the audio data.

DETAILED DESCRIPTION

Figure 1:
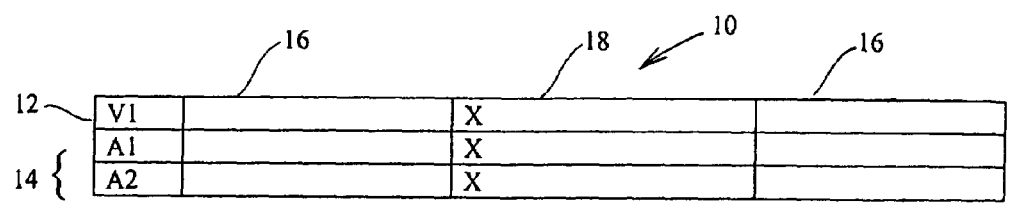
FIG. 1 is a diagram of a timeline representing an audiovisual work.

FIG. 1 illustrates a part of a typical user interface of a video editing system for editing audiovisual programs, called a timeline 10. A timeline represents the program using one or more video tracks 12 and one or more audio tracks 14. In this example, one video track and two audio tracks are shown. Various interfaces, other than a timeline with tracks shown in FIG. 1, may be used to define the audiovisual program in a video editing system, such as interfaces common to compositing systems, audio editing systems and animation tools. On each track in timeline 10, a sequence of clips 16 is shown. In this example, the clips designated with an "X" (18) are synchronized, and start and end at the same time. The "X" need not be part of the displayed timeline. Thus, this example represents a video clip synchronized with a two-track audio clip. A clip on the timeline may be defined using a reference to a file that stores actual media data for the clip and a range within the media data stored in that file. Audio and video data may be stored in the same file or in separate files.

The application of a retiming effect to a clip also may, or may not, affect the duration of the clip. In particular, if a clip has a number of samples at a sampling rate, and if that number of samples is processed using the retiming function, then the result of the retiming effect is a new number of samples at the original sampling rate, but with a different perceived playback rate. The clip may become shorter or longer depending on the retiming function. If the clip is in an audiovisual work when the retiming effect is applied, and if the retiming effect modifies the duration of the clip, then the synchronization of the rest of the audiovisual work may be affected. If the retiming effect does not modify the duration, then the synchronization of the rest of the audiovisual work will not be affected.

Accordingly, before a clip is placed in an audiovisual work, a retiming effect may be applied to the specified range of a media file. The duration resulting from the application of the retiming effect to the specified range of the media file defines the duration of the clip that may be placed on a timeline representing the audiovisual work.

After a clip is placed in an audiovisual work, when the retiming effect is applied, the specified range of the media file that is used may be changed so that the retimed clip has the same duration as the original clip. Such a change to the specified range of the media file might exceed the contents of the media file. In such a case, the duration of the retimed clip might be changed, or an error might be signaled to the editor, or the last sample from the media file might be held for the remaining duration of the retimed clip. If the retimed clip includes media that the editor does not want, then the editor could trim the retimed clip.

Figure 2:
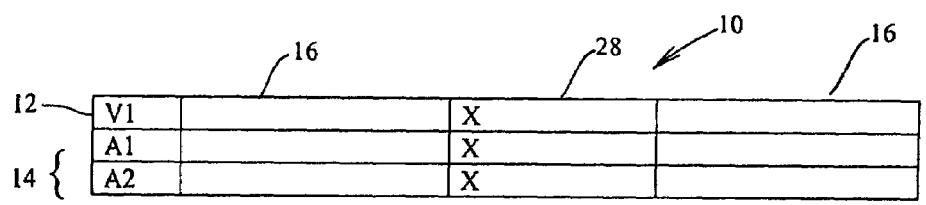
FIG. 2 is a diagram of a timeline representing the audiovisual work with a retimed clip.

Referring now to FIG. 2, the original clip 18 (FIG. 1) in the audiovisual program has been retimed to have a perceived playback rate that is faster than the original playback rate. In this example, the clip has a new duration because the number of output samples has changed, as indicated by the reduced length of the clip 28 as shown in the timeline 10.

A retiming effect is specified by a retiming function, which will now be described. To maintain synchronization while retiming, the input times determined for output times for video samples are calculated to correspond to input times determined for the same output times for the audio samples. An input time determined for each output time for video samples may be identical to or offset from an input time determined for the same output time for audio samples. This correspondence can be achieved in several ways.

One way to achieve this correspondence is to use a position curve that maps each output sample time to an input time. The same position curve is used to retime both the audio and the video data. A position curve can be defined in many ways. For example, a user may define the position curve through a user interface that allows a function curve to be defined.

Figure 3:
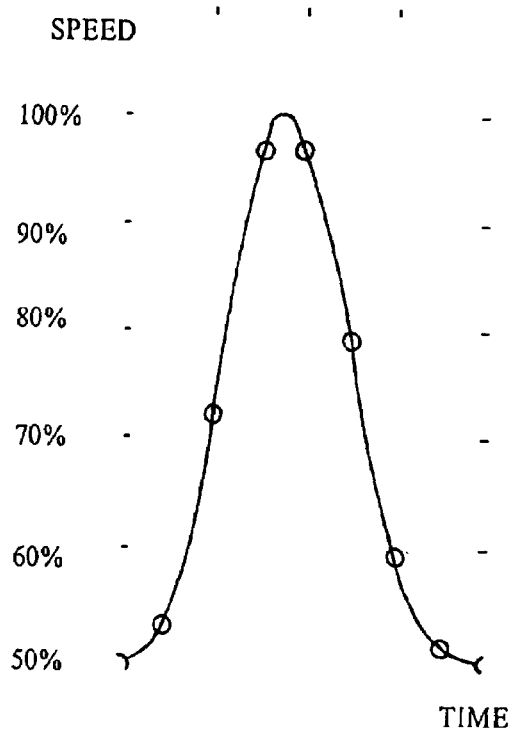
FIG. 3 is a diagram of an example speed curve.

Another way to achieve this correspondence is to use a speed curve that represents the perceived speed of playback, in comparison to the original speed of playback. For example, a speed curve is shown in FIG. 3. The curve in FIG. 3 represents the speed on the vertical axis and time on the horizontal axis. With the example curve that is shown, playback starts at 50% of the original playback speed, gradually increases to 100% of original playback speed, then gradually decreases to 50% of the original playback speed. A speed curve can be defined in many ways. For example, a user may define the speed curve through a user interface that allows a function curve to be defined.

If a speed curve defines the retiming function, the speed curve is converted to a position curve by computing an integral of the speed curve. The position curve is used to retime the clip. To generate the integral for a curve, digital computers often calculate the integral using numerical methods which approximate a Riemann sum, i.e. summing the area of the rectangles or trapezoids under the curve using a small value, called the step size, that defines the width of the rectangle or trapezoid. Normally, video editing systems calculate the integral using a step size that equals one over the field rate (e.g., the step size=$\frac{1}{60}$ sec), but audio editing systems calculate an integral using a step size that equals one over the audio sample rate (e.g., step size=$\frac{1}{44,100}$ sec). A constant also is used in the calculation of an integral. This constant may be specified as the time code of the first frame of the source material. Alternatively, the user may specify some other frame of the source material as an "anchor frame" to provide the constant time value for the integral calculation.

Figure 4B:
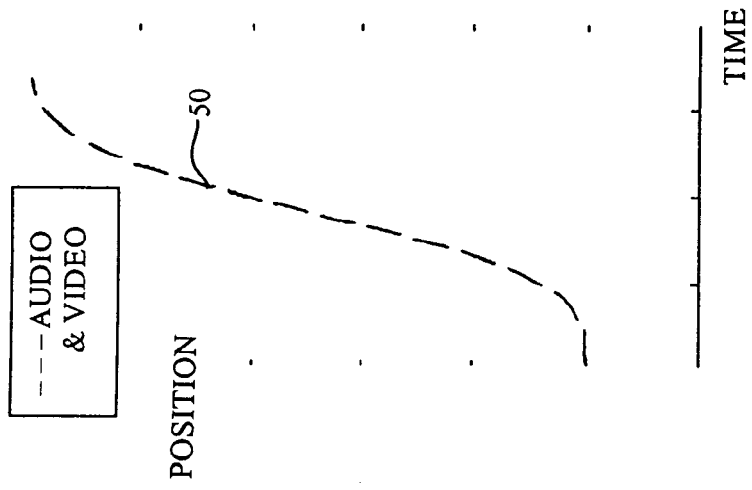
FIG. 4B is a diagram of a position curve generated from the example speed curve using the same step sizes for audio and video data.
Figure 4A:
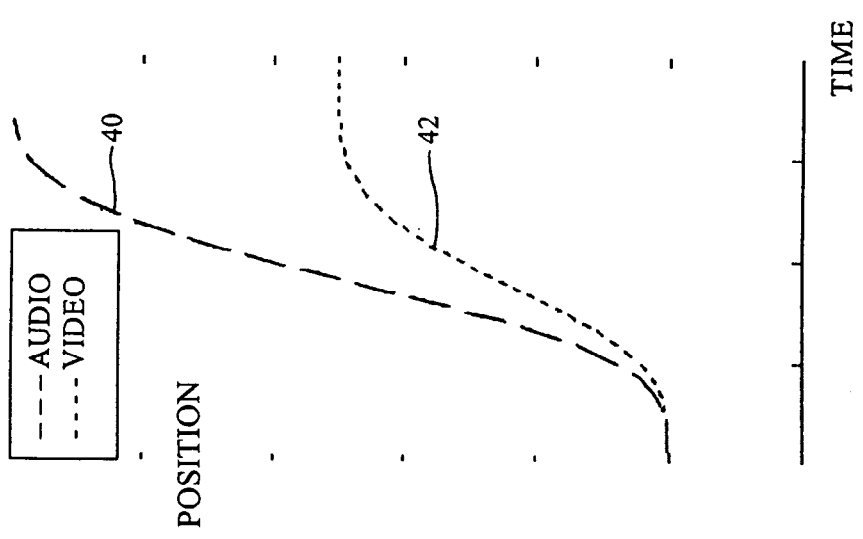
FIG. 4A is a diagram of position curves generated from the example speed curve using different step sizes for audio and video data.

Using the speed curve from FIG. 3, the integral for the audio using a step size for a typical audio system is shown at 40 in FIG. 4A. The integral for the video using a typical step size for a video system results in the position curve shown at 42 in FIG. 4A. Notably, the position curves are different. When the position curves are different as in FIG. 4A, the same points in time in the original audio data and the original video data do not map to the same output time. Therefore, if the audio were retimed on an audio system and if the video were retimed on a video system, the resulting retimed data would not be synchronized.

Instead, the position curve is calculated by integrating the speed curve using a step size that is less than or equal to the minimum of the reciprocal of the audio sample rate and the reciprocal of the video sample rate. The integral used to obtain the position curve for video thus is computed using a step size that is less than or equal to a step size corresponding to a sampling rate of the audio data, rather than the reciprocal of the video rate. As a result, using the speed curve of FIG. 3 as an example, the same position curve is used to retime both the audio and video, as indicated at 50 in FIG. 4B. The sampling rate of the audio data used by an audio editing workstation is thus shared with the video editing system.

Figure 5:
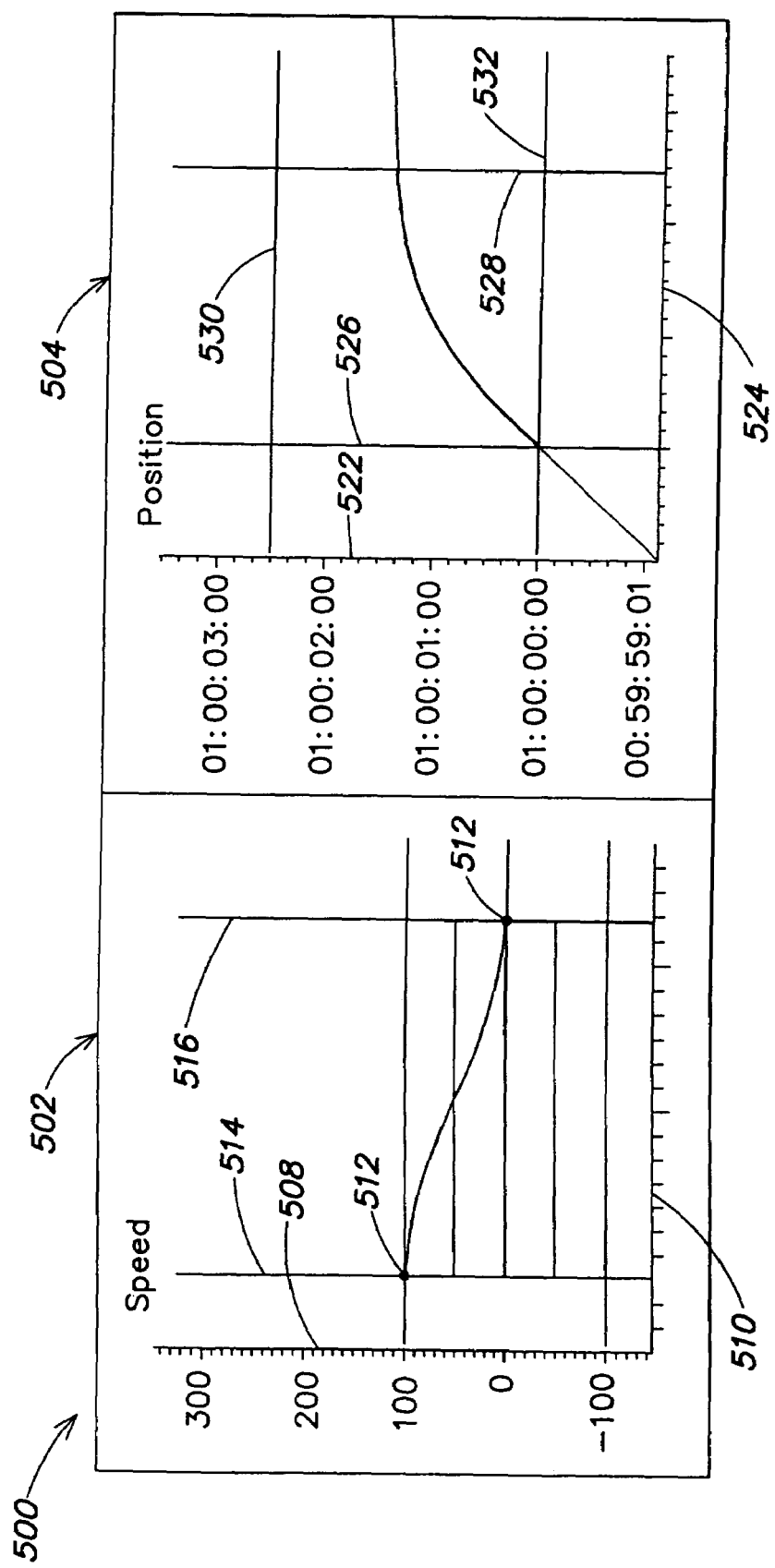
FIG. 5 is an illustration of a graphical user interface that allows a user to define a retiming effect.

An example graphical user interface that allows a user to specify a speed curve or position curve for a retiming effect will now be described in connection with FIG. 5. This user interface may be made available to an editor if an editor selects a retiming effect to be applied either to source material or to a clip on the timeline.

In this interface 500, a speed graph 502 and position graph 504 are shown. The editor, using an appropriate selection mechanism, may select either graph for editing. Another selection mechanism can be provided to allow only one or both of the graphs to be shown.

In the speed graph, the vertical axis 508 represents the speed as a percentage of the original playback speed of the clip. The horizontal axis 510 represents the output times. The editor may specify keyframes (e.g., 512) on the graph to associate an output time with a perceived playback speed. A keyframe signifies that, at the output time indicated by the keyframe, the associated perceived playback speed will be applied. For output times between the specified keyframes, the remainder of points on the function curve is interpolated. For output times before the first keyframe and after the last keyframe, values may be extrapolated or may be held constant. Controls may be provided to allow a user to select a keyframe and to navigate among the keyframes. On the speed graph, left and right boundaries, shown as vertical lines 514 and 516, indicate the start and stop times of the retimed clip, thus its duration.

The position graph display 504 shows a representation of an integral of the speed curve. If the speed graph is being edited, then the position graph display shows the corresponding position graph, with corresponding keyframes. The position graph may be edited, in which case the speed graph display shows the corresponding speed graph, with corresponding keyframes.

In the position graph display 504, the vertical axis 522 illustrates input times, in terms of the video time code of the source material to which the retiming effect is being applied. The horizontal axis 524 illustrates output times. Left and right boundaries, shown as vertical lines 526 and 528, represent the start and stop times of the retimed clip, and thus its duration. The top horizontal line 530 represents the end of the source material available in the referenced media file. The bottom horizontal line 532 represents the beginning of the source material available in the referenced media file. The top and bottom horizontal lines allow an editor to determine whether enough source material is available to be processed by the specified retiming effect.

The interface also may allow a user to specify various parameters of the retiming effect, such as the kind of resampling function used. An anchor frame may be selected by a user in many ways, such as by input of a timecode or by manipulation of a specified keyframe that is designated as an anchor frame. The format of the output data may be specified, if different from the format of the input data. In such a case, the resampling function also converts the format of the data. The interface also may provide status information, such as the duration of the effect.

Another way to achieve the correspondence of input times and output times is to use different position curves for the audio and video data so long as the input times of audio and video events that should be synchronized map to the same output time. In particular, video and audio events are identified and related to each other and a corresponding output time. Such a mapping provides separate position curves for the audio data and the video data. Because the resulting position curves directly describe the mapping of output times to input times, the input audio times and the input video times are obtained directly from the position curves. Because the position curves map video and audio events to the same output times, synchronization of those events is retained.

Visual and audio events may be identified manually or automatically. Examples of audio and video events are phonemes and visemes (visual appearance of a mouth articulating a phoneme). An example of corresponding phonemes and visemes is an onset of a 'P' sound and lips closing prior to pronunciation of a 'P'. Identification of corresponding audio and video events can be achieved by an editor or by a computer, and can be tracked by placing locators on a timeline.

Figure 6:
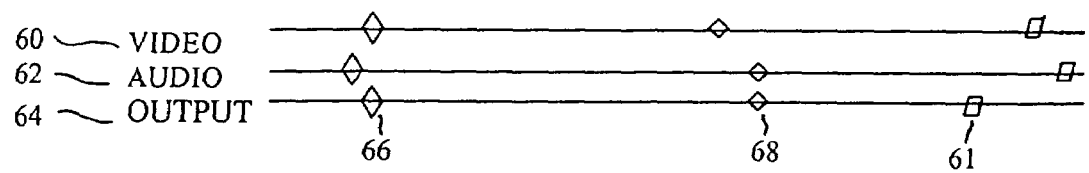
FIG. 6 is an illustration of a graphical user interface that allows input audio and video times to be related to an output time.

A user interface that allows different position curves to be defined for audio and video will now be described in connection with FIGS. 6 and 7. Referring to FIG. 6, three parallel timelines are shown: a video timeline 60, an audio timeline 62 and an output timeline 64. Each event is indicated by three locators, one for each of the video, audio and output times for the event. Each locator for an event has a common shape. Each event has a different shape. The time of a locator in the output timeline may correspond to a locator in the video track, to one in the audio track or to a time different from either. In FIG. 6, three events are shown. In the first event noted at 66, the audio is retimed to match the original video. The video event time and the output time are the same. In the second event noted at 68, the video is retimed to match the original audio. The audio event time and the output time are the same. In the third event noted at 61, both the video and the audio are retimed to produce a new output pacing.

From the relative position of the locators in the video, audio and output tracks, two position curves are derived separately. To define the curve for an input track, for each event in the output track a point or keyframe is defined, where x is the output time of the event on the output track and y is the input time of the event on the input track. The set of points or keyframes obtained for the set of events may then be joined by a function, for example, a piecewise linear function or a smooth function such as a spline or a Bezier curve, that passes through all of the points.

Figure 7:
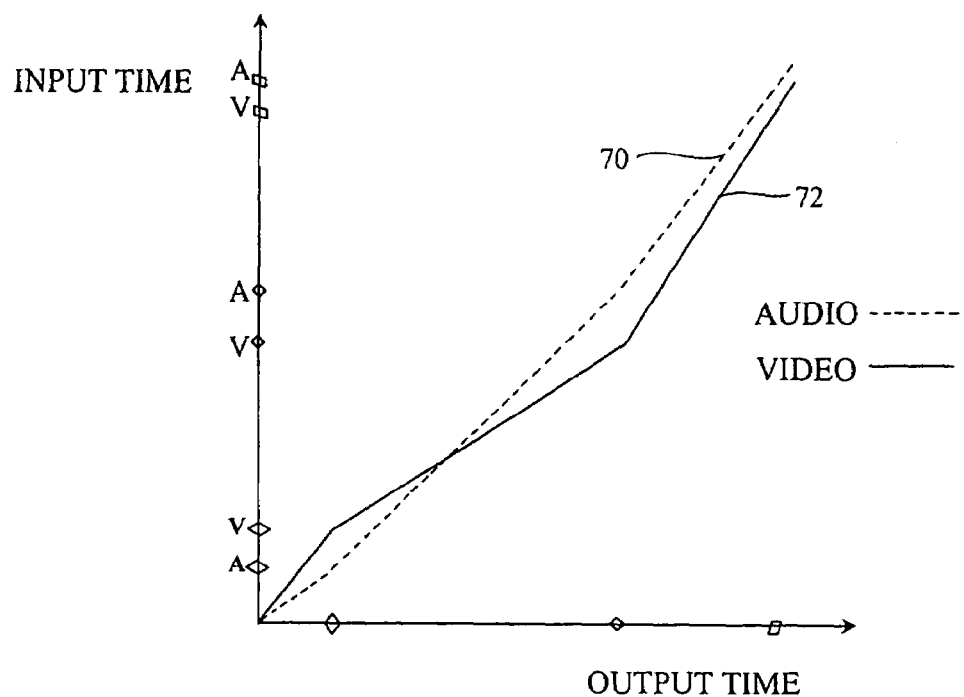
FIG. 7 is a diagram of position curves resulting from the user interface of FIG. 6.

Position curves corresponding to the events shown in FIG. 6 are shown in FIG. 7. The first curve maps output times to input times for retiming video, at 72, and the other curve maps output times to input times for retiming audio, at 70. The two curves are plotted on the same axes for convenience and comparison. The curves shown are piecewise linear, but also may be splines or Bezier curves to provide smooth motion or pace changes. Synchronization is achieved because corresponding video and audio events map to a single output time.

An example application of the technique shown in FIGS. 6 and 7 is in automatic dialog replacement (ADR). ADR is used, for example, if the audio track of a shot is poor and is replaced with a new recording. To maintain lip sync, the timing of events in the new recording must match the timing of events in the video. Using the above technique for specifying a position curve, both the timing and the pacing of events may be changed from that of any of the original recordings while maintaining lip sync.

After an editor specifies a retiming function, the specification may be stored as data associated with the specified clip of video and audio data. Preferably, the retiming function is defined as a position curve using a continuous or piecewise continuous function to allow different systems with different sampling rates to use the same position curve. If a speed curve is used, a step size value used to generate a retimed clip also may be stored to allow different systems to generate the same position curves from the speed curve.

In a video editing system in which clips are defined by references to files, the retiming function may be applied to the media data in the data files during playback or before playback. If the retiming function is applied before playback, the original media data files may remain unchanged and the clip may be modified to include a reference to a data file that stores the retimed media data, which may be called a rendered or precompute file.

Having now described ways to specify the retiming function as a speed curve or position curve, and how the retiming function is associated with a clip, how synchronized audio and video is retimed will now be described.

In general, for each output time for an audio sample, a corresponding input time is determined from the retiming function. An output audio sample is computed at the output time based on at least the audio data in the neighborhood of the corresponding input time using a resampling function. The neighborhood is a plurality of audio samples from points in time surrounding the input time. The number of input audio samples actually used depends on the resampling function that is used to compute the audio output sample. An audio resampling function generates an output audio sample from a plurality of input audio samples at different points in time by combining information from the plurality of input audio samples.

For each output time for a video sample, a corresponding input time is determined from the output time and the retiming function, such that an input time determined for an output time for a video sample corresponds to an input time determined for the same output time for an audio sample. An output video sample is computed at the output time based on at least the video data in the neighborhood of the corresponding input time using a resampling function. The neighborhood is a specified number of video samples from points in time surrounding the input time. The number of input video samples so specified depends on the resampling function that is used to compute the output video sample. A video resampling function generates an output video sample from a plurality of input video samples at different points in time by combining information from the plurality of input video samples.

The output audio samples may be computed using any of a number of resampling functions, including, but not limited to time scaling and pitch shifting. Techniques for time scaling and pitch shifting are described for example in "A Sines+Transients+Noise Audio Representation for Data Compression and Time/Pitch Scale Modifications," by Scott Levine and Julius Smith III, in Proceedings of the 105th Audio Engineering Society Convention, San Francisco, 1998. A commercially available product that performs time scaling is called SPEED, available from Wave Mechanics, of Burlington, Vt.

The output video samples may be computed using any of a number of resampling functions, including, but not limited to blended frames or motion-based interpolation. Motion based interpolation is described in U.S. patent application Ser. No. 09/657,699, entitled "INTERPOLATION OF A SEQUENCE OF IMAGES USING MOTION ANALYSIS."

A retiming effect may be rendered to create a new media file containing the retimed clip, or may be applied in real time to source material. Whether a retiming effect may be processed in real time during playback depends on the processor speed of the computer, the disk access speed and the resampling technique used for the video and the audio and whether any degradation of the image quality, in either the spatial or temporal dimensions, is permitted.

Figure 8:
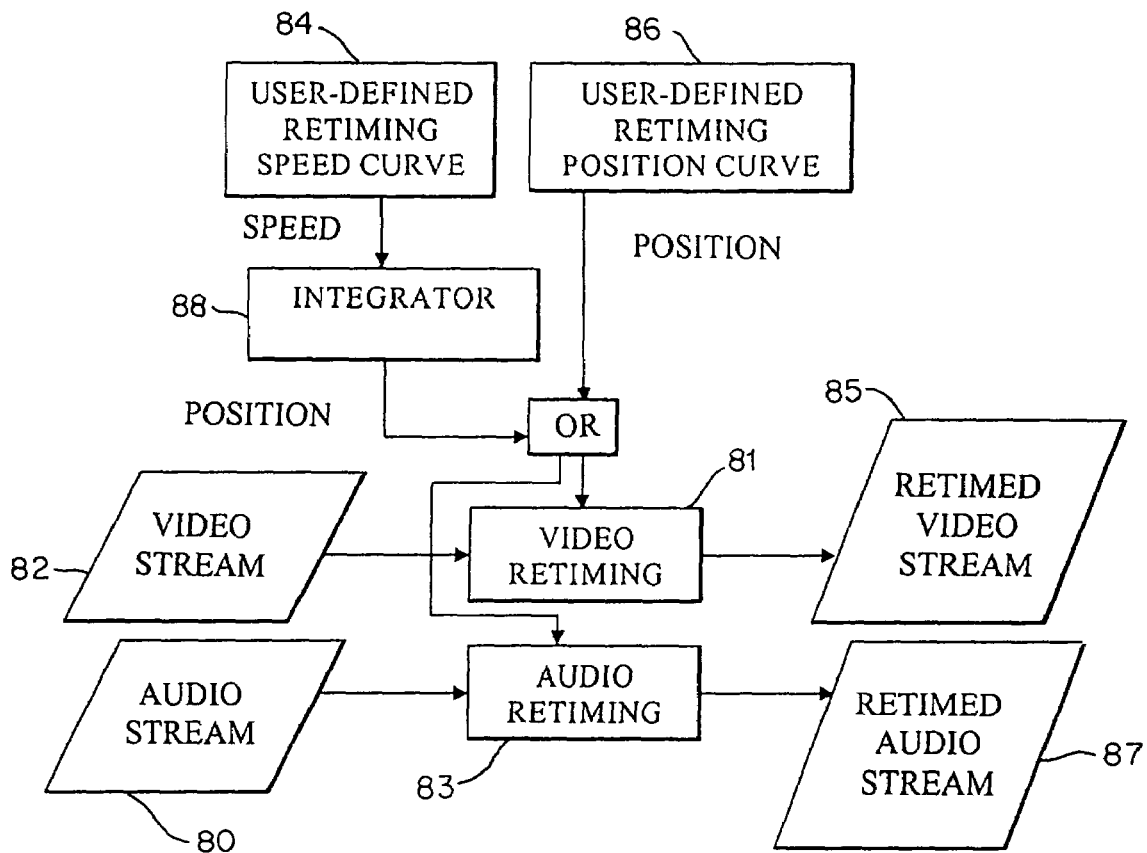
FIG. 8 is a block diagram of a system that applies a retiming function to audio and video data.

Referring now to FIG. 8, a block diagram of a system for performing such retiming will now be described. The inputs used in generating synchronized retiming of an audiovisual clip are an audio stream 80, a video stream 82, and either a user-defined speed curve 84 or position curve 86. A system may provide the capability of an editor to specify either a speed curve, position curve or both. If the position curve is used, the time values used of the audio samples and video data may be obtained directly from the function. If a speed curve is used it is integrated, as shown at 88, to produce a position curve. The integral used to convert the speed to position is performed according to the specification above— in particular, the position curve is computed by integrating the speed curve using a step size that is less than or equal to the reciprocal of the audio sample rate. The position curve is used by both video retiming 81 and audio retiming 83 to produce the corresponding retimed video stream 85 and retimed audio stream 87.

Figure 9:
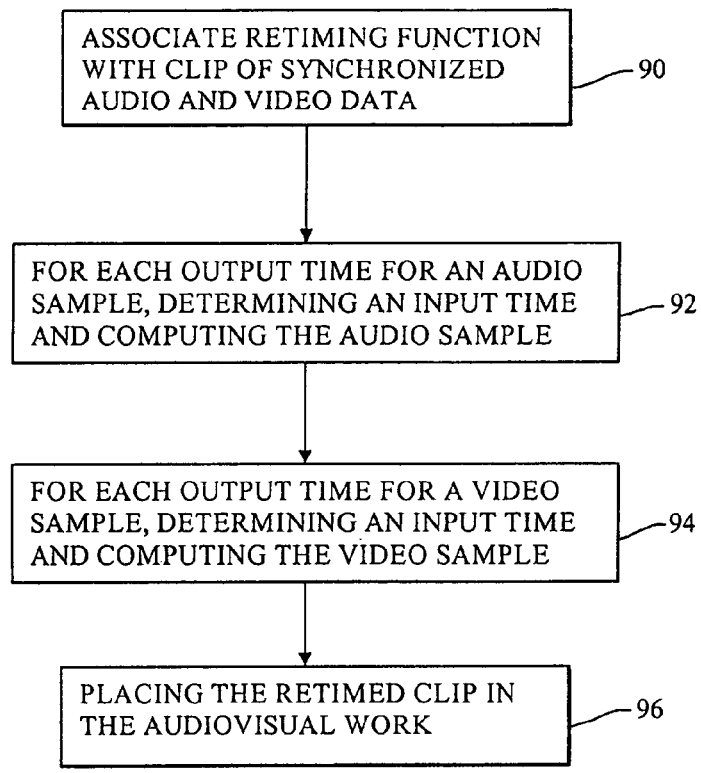
FIG. 9 is a flow chart describing how a retiming function may be applied using a video editing system for editing the audio.

Referring to FIG. 9, a flowchart representing operation of a video editing system that produces retimed audio and video data of an audiovisual work using such a retiming effect will now be described. In such a system a retiming effect on a clip of synchronized audio data and video data is performed to produce a retimed clip of synchronized audio and video data in the audiovisual work. The system associates (90) a definition of a retiming function for a rampable retiming effect that maps output times to input times with the clip of synchronized audio data and video data. The synchronized audio data and video data is processed according to the retiming function to produce the retimed clip. Such processing includes, for each output time for an audio sample, determining (92) a corresponding input time from the output time and the retiming function, and computing an output audio sample at the output time based on at least the audio data in the neighborhood of the corresponding input time. Similarly, for each output time for a video sample, a corresponding input time is determined (94) from the output time and the retiming function, such that the input time determined for the output time for a video sample corresponds to the input time determined for the same output time for an audio sample. An output video sample is computed at the output time based on at least the video data in the neighborhood of the corresponding input time. The retimed clip is placed (96) in the audiovisual work. The retimed clip also can be played back.

Figure 10:
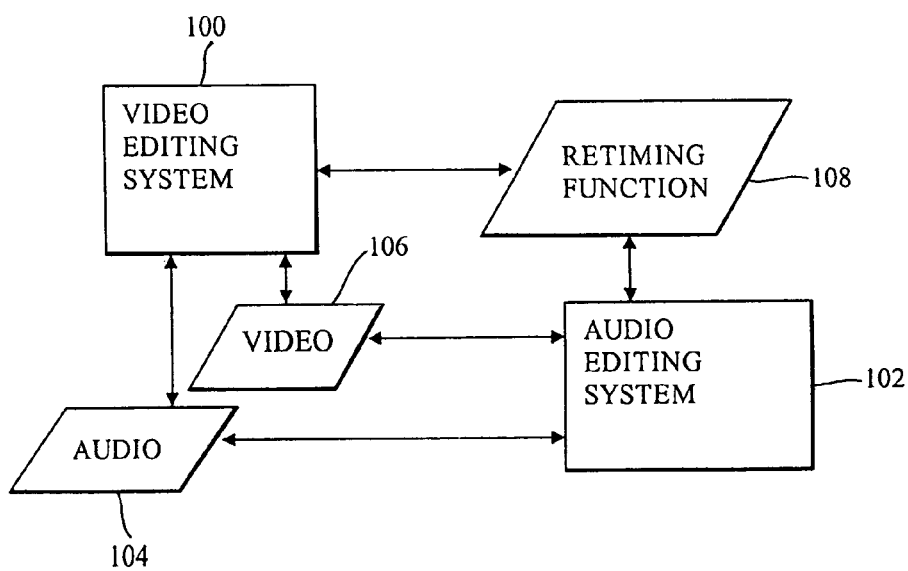
FIG. 10 is a flow chart describing how a retiming function may be applied using a video editing system and an audio editing system.

Referring to FIG. 10, a dataflow diagram of a system using a video editing system 100 and an audio editing system 102 will now be described. A retiming effect 108 on a clip of synchronized audio data 104 and video data 106 is defined. The video editing system 100 and an audio editing system 102 enable an editor to see and hear the retimed clip as part of an audiovisual work. The specifications of the work are transferred between the video editing system 100 and the audio editing system 102 to allow modification to the video or to the audio. Such a situation may arise, for example, where different individuals are working in a group on different parts of the audiovisual work.

In one embodiment, the video editing system 100 provides retimed video data. To produce the retimed video data, if the retiming function is defined as a speed curve, the video editing system also receives a description of the sampling rate of the audio from the audio editing system. The audio editing system 102 produces the retimed audio data from the original audio data and synchronizes the retimed audio data with the retimed video data. In particular, the audio editing system receives a definition of a retiming function, the original audio data and the audiovisual work including a retimed video clip. The audio editing system then processes the audio data according to the retiming function to produce a retimed audio clip. As a result, the retimed audio is synchronized with the retimed video in the audiovisual work.

In another embodiment, the audio editing system 102 provides retimed audio data, and the video editing system 100 produces the retimed video data from the original video data and synchronizes the retimed video data with the retimed audio data. In particular, the video editing system receives a definition of a retiming function, the video data and the audiovisual work including a retimed audio clip. In the exchange of information between the audio editing system 102 and the video editing system 100, the sampling rates used for the audio data is shared if the retiming function is defined as a speed graph. The video data is then processed according to the retiming function to produce a retimed video clip. As a result, the retimed video is synchronized with the retimed audio in the audiovisual work.

Having now described an example embodiment, it should be apparent to those skilled in the art that the foregoing is merely illustrative and not limiting, having been presented by way of example only. Numerous modifications and other embodiments are within the scope of one of ordinary skill in the art. For example, the example above describes synchronization of audio and video data. Retiming of synchronized data streams in this manner can be extended to any temporal data streams, or data streams with temporal relationships, where the data in the different data streams is of different types. For example, an event such as a trigger in an interactive television program is tied to a particular output time or input time of another media type, such information can be used to adjust the timing of the trigger if the other media is retimed.

These and other modifications and embodiments are contemplated as falling within the scope of the invention.

What is claimed is:

1. In a system for editing an audiovisual work, a method for producing a retiming effect on a clip of synchronized audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio data and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

associating a definition of a retiming function for a rampable retiming effect that maps output times to input times with the clip of synchronized audio data and video data;

processing the synchronized audio data and video data according to the retiming function to produce the retimed clip, wherein processing comprises:

for each output time for an audio sample,
  determining a corresponding input time from the output time using the retiming function; and
  computing an output audio sample for the output time by applying an audio resampling function to a plurality of input audio samples from points in time surrounding the corresponding input time, wherein the audio resampling function combines information from the plurality of input audio samples to produce the output audio sample; and for each output time for a video sample,
  determining a corresponding input time from the output time using the retiming function, such that input times determined for output times for video samples correspond to input times determined for the same output times for audio samples; and
  computing an output video sample for the output time by applying a video resampling function to a plurality of input video samples from points in time surrounding the corresponding input time, wherein the video resampling function combines information from the plurality of input video samples to produce the output video sample.

2. The method of claim 1, wherein the retiming function is defined as a speed curve, and wherein the speed curve is integrated to determine the input times from output times for both video data and audio data, wherein a step size used to compute an integral of the speed curve is less than or equal to a step size corresponding to a sampling rate of the audio data.

3. The method of claim 1, wherein determining the output audio sample uses a time-scaling function.

4. The method of claim 3, wherein determining the output video sample uses motion based interpolation.

5. The method of claim 3, wherein determining the output video sample uses blended frames.

6. The method of claim 1, wherein determining the output audio sample uses a resampling function with pitch shifting.

7. The method of claim 6, wherein determining the output video sample uses motion based interpolation.

8. The method of claim 6, wherein determining the output video sample uses blended frames.

9. The method of claim 1, wherein an input time determined for any output time for a video sample is identical to an input time determined for the same output time for an audio sample.

10. The method of claim 1, wherein an input time determined for each output time for video samples is offset from an input time determined for the same output time for audio samples.

11. The method of claim 1, wherein the retiming function comprises a mapping of a plurality of video events in the input video data and a corresponding plurality of audio events in the input audio data to a corresponding plurality of output times in the retimed clip.

12. The method of claim 1, further comprising computing a position curve for audio from the mapping, and wherein determining an input time from an output time for an audio sample uses the position curve.

13. The method of claim 1, further comprising computing a position curve for video from the mapping, and wherein determining an input time from an output time for a video sample uses the position curve.

14. The method of claim 1, further comprising receiving an indication of the mapping by:

presenting a graphical user interface including a video track, an audio track and an output track;
receiving an indication of a video event in the video data on the video track through an input device;
receiving an indication of an audio event in the audio data on the audio track through an input device;
receiving an indication of an output time in the retimed clip on the output track through the input device; and
maintaining information indicating a correspondence between the indicated video event, the indicated audio event and the indicated output time.

15. The method of claim 14, further comprising computing a position curve for audio from the mapping, and wherein determining an input time from an output time for an audio sample uses the position curve.

16. The method of claim 15, further comprising computing a position curve for video from the mapping, and wherein determining an input time from an output time for a video sample uses the position curve.

17. The method of claim 14, further comprising computing a position curve for video from the mapping, and wherein determining an input time from an output time for a video sample uses the position curve.

18. A computer program product, comprising:
a computer readable medium;

computer program instructions stored in the computer readable medium that, when executed by a computer, instruct the computer to perform a method for producing a retiming effect on a clip of synchronized audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio data and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

associating a definition of a retiming function for a rampable retiming effect that maps output times to input times with the clip of synchronized audio data and video data;

processing the synchronized audio data and video data according to the retiming function to produce the retiming clip, wherein processing comprises:

for each output time for an audio sample, determining a corresponding input time from the output time using the retiming function; and computing an output audio sample for the output time by applying an audio resampling function to a plurality of input audio samples from points in time surrouding the corresponding input time, wherein the audio resampling function combines information from the plurality of input audio samples to produce the output audio sample; and for each output time for a video sample, determining a corresponding input time from the output time using the retiming function, such that input times determined for output times for video samples correspond to input times determined for the same output times for audio samples; and computing an output video sample for the output time by applying a video resampling function to a plurality of input video samples from points in time surrounding the corresponding input time, wherein the video resampling function combines information from, the plurality of input video samples to produce the output video sample.

19. An editing system for editing an audiovisual work and for producing a retiming effect on a clip of synchronized audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio data and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

means for relating a definition of a retiming function for a rampable retiming effect that maps output times to input times with the clip of synchronized audio data and video data;

means for processing the synchronized audio data and video data according to the retiming function to produce the retimed clip, comprising:

means for computing, for each output time for an audio sample, a corresponding input time from the output time using the retiming function;

means for computing an output audio sample for the output time by applying an audio resampling function to a plurality of input audio samples from points in time surrounding the corresponding input time, wherein the audio resampling function combines information from the plurality of input audio samples to produce the output audio sample;

means for computing, for each output time for a video sample, a corresponding input time from the output time using the retiming function, such that input times determined for output times for video samples correspond to input times determined for the same output times for audio samples; and means for computing an output video sample for the output time by applying a video resampling function to a plurality of input video samples from points in time surrounding the corresponding input time, wherein the video resampling function combines information from the plurality of input video samples to produce the output video sample.

20. An editing system for editing an audiovisual work and for producing a retiming effect on a clip of synchronized audio dala and video data, wherein the audio data comprises a sequence audio samples wherein each audio sample has a corresponding input time, and wherein the video data comprises a sequence of video samples wherein each video sample has a corresponding input time, to produce a retimed clip of synchronized audio data and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

an editing interface allowing a user to associate a definition of a retiming function for a rampable retiming effect that maps output times to input times with the clip of synchronized audio data and video data;

an audio retiming module having an input for receiving the definition of the retiming function and an input for receiving the audio data, and an output providing retimed audio data such that, for each output time for an audio sample, an output audio sample is computed by applying an audio resampling function to a plurality of input audio samples from points in time surrounding an input time mapped to the output time by the retiming function, wherein the audio resampling function combines information from the plurality of input audio samples to produce the output audio sample; and a video retiming module having an input for receiving the definition of the retiming function and an input for receiving the video data, and an output providing retimed video data such that, for each output time for a video sample, an output video sample is computed by applying a video resampling function to a plurality of input video samples from points in time surrounding an input time mapped to the output time by the retiming function, wherein the video resampling function combines information from the plurality of input video samples to produce the output video sample, wherein input times determined for output times for video samples correspond to input times determined for the same output times for audio samples.

21. A digital entertainment product, comprising:
a computer readable medium;
information stored on the computer readable medium that, when read by a computer, indicates to the computer a retimed clip of synchronized audio data and video data, produced according to a process for retiming a clip of synchronized audio data and video data, wherein the audio data comprises a sequence of audio samples wherein each audio sample has a corresponding input time, and wherein the video data comprises a sequence of video samples wherein each video sample has a corresponding input time, to produce the retimed clip of synchronized audio data and video data in the audiovisual work, wherein in the retimed clip the audio data comprises a sequence of audio samples wherein each audio sample has a corresponding output time, and wherein the video data comprises a sequence of video samples wherein each video sample has a corresponding output time, the process comprising:
associating a definition of a retiming function for a rampable retiming effect that maps output times to input times with the clip of synchronized audio data and video data;
processing the synchronized audio data and video data according to the retiming function to produce the retimed clip, wherein processing comprises:
for each output time for an audio sample,
  determining a corresponding input time from the output time using the retiming function; and
  computing an output audio sample for the output time by applying an audio resampling function to a plurality of input audio samples from points in time surrounding the corresponding input time, wherein the audio resampling function combines information from the plurality of input audio samples to produce the output audio sample; and
for each output time for a video sample,
  determining a corresponding input time from the output time using the retiming function, such that input times determined for output times for video samples correspond to input times determined for the same output times for audio samples; and
  computing an output video sample for the output time by applying a video resampling function to plurality of input video samples from points in time surrounding the corresponding input time, wherein the video resampling function combines information from the plurality of input video samples to produce the output video sample.

22. In a system for editing an audiovisual work including a sequence of a plurality of clips of audiovisual data, a method for producing a retiming effect on a clip of synchronized audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio data and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:
associating a definition of a retiming function for a rampable retiming effect that maps output times to input times with the clip of synchronized audio data and video data;
processing the video data of the clip according to the retiming function to produce a retimed video clip, wherein processing comprises:
for each output time for a video sample,
  determining a corresponding input time from the output time using the retiming function; and
  computing an output video sample for the output time by applying a video resampling function to a plurality of input video samples from points in time surrounding the corresponding input time, wherein the video resampling function combines information from the plurality of input video samples to produce the output video sample;
placing the retimed video clip in the audiovisual work; and
exporting the audiovisual work to an audio editing system, including the definition of the retiming function, for processing the audio data of the clip according to the retiming function, such that an input time determined for each output time for video samples corresponds to an input time determined for the same output time for audio samples.

23. In a system for editing an audiovisual work including a sequence of a plurality of clips of audiovisual data, a method for producing a retiming effect on a clip of synchronized audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio and video data in the audiovisual work, wherein in the retimed clip the audio data comprises a senuence of audio samples wherein each audio sample has a corresponding output time, and wherein the video data comprises a sequence of video samiles wherein each video sample has a corresponding output time, comprising:
receiving a definition of a retiming function for a rampable retiming effect that maps output times to input times associated with the clip of synchronized audio data and video data;
receiving the audio data;
receiving the audiovisual work including a retimed video clip processed according to the retiming function;
processing the audio data according to the retiming function to produce a retimed audio clip, wherein processing comprises:
for each output time for an audio sample,
  determining a corresponding input time from the output time using the retiming function, such that an input time determined for each output time for video samples corresponds to an input time determined for the same output time for audio samples; and
  computing an output audio sample for the output time by applying an audio resampling function to a plurality of input audio samples from points in time surrounding the corresponding input time, wherein the audio resampling function combines information from the plurality of input audio samples to produce the output audio sample; and
synchronizing the retimed audio clip with the retimed video clip in the audiovisual work.

24. In a system for editing an audiovisual work including a sequence of a plurality of clips of audiovisual data, a method for producing a retiming effect on a clip of synchronized audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

receiving a definition of a retiming function for a rampable retiming effect that maps output times to input times associated with the clip of synchronized audio data and video data;

receiving the video data;

receiving the audiovisual work including a retimed audio clip processed according to the retiming function;

processing the video data according to the retiming function to produce a retimed video clip, wherein processing comprises:

for each output time for a video sample,
  determining a corresponding input time from the output time for the retiming function, such that an input time determined for each output time for video samples corresponds to an input time determined for the same output time for audio samples; and
  computing an output video sample for the output time by applying a video resampling function to a plurality of input video samples from points in time surrounding the corresponding input time, wherein the video resampling function combines information from the plurality of input video samples to produce the output video sample; and synchronizing the retimed video clip with the retimed audio clip in the audiovisual work.

25. In a system for editing an audiovisual work, a method for defining a retiming effect applied to audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

associating a mapping of a plurality of video events in the video data and a corresponding plurality of audio events in the audio data to a corresponding plurality of output times in the retimed clip;

processing the audio data according to an audio resampling function that generates each output audio sample, for each output time for the retimed clip, from a plurality of input audio samples from points in time in the audio data surrounding an input time mapped to the output time, to produce retimed audio data, wherein the audio resampling function combines information from the plurality of input audio samples to produce the output audio sample;

processing the video data according to a video resampling function that generates each output video sample, for each output time for the retimed clip, from a plurality of input video samples from points in time in the video data surrounding an input time mapped to the output time, to produce retimed video data, wherein the video resampling function combines information from the plurality of input video samples to produce the output video sample; and placing the retimed audio data and retimed video data in the audiovisual work as the retimed clip of synchronized audio and video data.

26. The method of claim 25, wherein processing the audio data comprises computing a position curve for audio from the mapping;
for each output time for an audio sample,
  determining the corresponding input time from the output time using the position curve; and
  computing an output audio sample for the output time based on the plurality of input audio samples from points in time surrounding the corresponding input time using the audio resampling function.

27. The method of claim 26, wherein processing the video data comprises computing a position curve for video from the mapping;
for each output time for a video sample,
  determining the corresponding input time from the output time using the position curve; and
  computing an output video sample for the output time based on the plurality of input video samples from points in time surrounding the corresponding input time using the video resampling function.

28. The method of claim 25, wherein processing the video data comprises computing a position curve for video from the mapping;
for each output time for a video sample,
  determining the corresponding input time from the output time using the position curve; and
  computing an output video sample for the output time based on the plurality of input video samples from points in time surrounding the corresponding input time using the video resampling function.

29. The method of claim 25, further comprising receiving an indication of the mapping by:

presenting a graphical user interface including a video track, an audio track and an output track;

receiving an indication of a video event in the video data on the video track through an input device;

receiving an indication of an audio event in the audio data on the audio track through an input device;

receiving an indication of an output time in the retimed clip on the output track through the input device; and maintaining information indicating a correspondence between the indicated video event, the indicated audio event and the indicated output time.

30. A computer program product, comprising:
a computer readable medium;
computer program instructions stored on the computer readable medium that, when executed by a computer, instructs the computer to perform a method for defining a retiming effect applied to audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

associating a mapping of a plurality of video events in the video data and a corresponding plurality of audio events in the audio data to a corresponding plurality of output times in the retimed clip;

processing the audio data according to an audio resampling function that generates each output audio sample, for each output time for the retimed clip, from a plurality of input audio samples from points in time in the audio data surrounding an input time mapped to tho output time, to produce retimed audio data, wherein the audio resampling function combines information from the plurality of input audio samples to produce the output audio sample;

processing the video data according to a video resampling function that generates each output video sample, for each output time for the retimed clip, from a plurality of input video samples from points in time in the video data surrounding an input time mapped to the output time, to produce retimed video data, wherein the video resampling function combines information from the plurality of input video samples to produce the output video sample; and placing the retimed audio data and retimed video data in thc audiovisual work as the retimed clip of synchronized audio and video data.

31. An editing system for defining a retiming effect applied to audio data and video data, wherein the audio data comprises a sequence of audio samples wherein each audio sample has a corresponding input time, and wherein the video data comprises a sequence of video samples wherein each video sample has a corresponding input time, to produce a retimed clip of synchronized audio and video data in the audiovisual work, wherein in the retimed clip the audio data comprises a sequence of audio samples wherein each audio sample has a corresponding output time, and wherein the video data comprises a sequence of video samples wherein each video sample has a corresponding output time, comprising:

means for mapping a plurality of video events in the video data and a corresponding plurality of audio events in the audio data to a corresponding plurality of output times in the retimed clip;

means for processing the audio data according to an audio resampling function that generates each output audio sample, for each output time for the retimed clip, from a plurality of input audio samples fiom points in time in the audio data surrounding an input time mapped to the output time, to produce retimed audio data, wherein the audio resampling function combines information from the plurality of input audio samples to produce the output audio sample;

means for processing the video data according to a video resampling function that generates each output video sample, for each output time for the retimed clip, from a plurality of input video samples from points in time in the video data surrounding an input time mapped to the output time, to produce retimed video data, wherein the video resampling function combines information from the plurality of input video samples to produce the output video sample; and means for inserting the retimed audio data and retimed video data in the audiovisual work as the retimed clip of synchronized audio and video data.

32. A method for applying a rampable retiming effect to synchronized streams of temporal media data, include a first stream of samples of a first media type wherein each sample has a corresponding input time, and a second stream of samples of a second media type different from the first media type, wherein each sample has a corresponding input time, to produce a retimed clip of synchronized temporal media data, wherein in the retimed clip each sample of the first media type has a corresponding output time and each sample of the second media type has a corresponding output time, comprising:

associating a retiming function for the rampable retiming effect with the synchronized streams, wherein the retiming function maps output times to input times;

processing the synchronized streams according to the retiming function, wherein processing comprises:

for each output time for the first stream,
  determining a corresponding input time from the output time using the retiming function; and
  computing an output sample for the first stream for the output time by applying a resampling function for the first media type to a plurality of input samples of the first media type from points in time surrounding the corresponding input time, wherein the resampling function for the first media type combines information from the plurality of input samples of the first media type to produce the output sample of the first media type; and for each output time for the second stream,
  determining a corresponding input time from the output time using the retiming function, such that an input time determined for an output time for a sample of the second stream corresponds to an input time determined for the same output times for a sample of the first stream; and
  computing an output sample for the second stream for the output time by applying a resampling function for the second media type to a plurality of input samples of the second media type from points in time surrounding the corresponding input time, wherein the resampling function for the second media type combines information from the plurality of input samples of the second media type to produce the output sample of the second media type.

33. A method for applying a rampable retiming effect to synchronized streams of temporal media data, wherein the streams include a first stream of samples of a first media type wherein each sample has a corresponding input time, and a second stream of samples of a second media type, wherein each sample has a corresponding input time, to produce a retimed clip of synchronized temporal media data, wherein in the retimed clip each sample of the first media type has a corresponding output time and each sample of the second media type has a corresponding output time, comprising:

associating a retiming function for the rampable retiming effect with the synchronized streams, wherein the retiming function defines a mapping of output times to input times, wherein the mapping has a corresponding temporal resolution of greater than or equal to a temporal resolution of both of the synchronized streams;

processilig the synchronized streams according to the retiming function, wherein processing comprises:

for each output time for the first stream, determining a corresponding input time from the output time using the mapping defined by the retiming function; and computing an output sample for the first stream for the output time by applying a resampling function for the first media type to a plurality of input samples of the first media type from points in time surrounding the corresponding input time, wherein the resampling function for the first media type combines information from the plurality of input samples of the first media type to produce the output sample of the first media type; and for each output time for the second stream, determining a corresponding input time from the output time using the mapping defined by the retiming function; and computing an output sample for the second stream for the output time by applying a resampling function for the second media type to a plurality of input samples of the second media type from points in time surrounding the corresponding input time, wherein the resampling function for the second media type combines information from the plurality of input samples of the second media type to produce the output sample of the second media type.

34. A method for applying a rampable retiming effect to temporal media data synchronized with metadata, wherein the temporal media data includes a sequence of samples wherein each sample has a corresponding input time, to produce a retimed clip, wherein the retimed clip includes a sequence of samples of temporal media data wherein each sample has a corresponding output time, comprising:

associating a retiming function for the rampable retiming effect with the temporal media data, wherein the retiming function maps output times to input times;

processing the temporal media data according to the retiming function, wherein processing comprises, for each output time, determining a corresponding input time from the output time using the retiming function; and computing an output sample of the temporal media data for the output time by applying a resampling function for the temporal media data to a plurality of input samples of the temporal media data from points in time surrounding the corresponding input time, wherein the resampling function for the temporal media data combines information from the plurality of input samples of the temporal media data to produce the output sample of the temporal media data; and processing the ractadata to synchronize the metadata with the retimed temporal media data.

* * * * *